United States Patent [19]

Kanda

[11] Patent Number: 4,629,526
[45] Date of Patent: Dec. 16, 1986

[54] METHOD OF AND MEANS FOR REPLACING CORRUGATING ROLLS IN A SINGLE FACER

[75] Inventor: Kousaku Kanda, Aichi, Japan

[73] Assignee: Isowa Industry Company, Ltd., Nagoya, Japan

[21] Appl. No.: 640,127

[22] Filed: Aug. 13, 1984

[30] Foreign Application Priority Data

Aug. 23, 1983 [JP] Japan ................................. 58-154363

[51] Int. Cl.$^4$ ........................... B31F 1/28; F16M 7/00
[52] U.S. Cl. .................................... 156/210; 156/462; 156/472; 248/639; 248/654
[58] Field of Search ............... 156/205, 210, 462, 470, 156/472, 473, 471; 425/369, 388, 396; 29/121.1, 121.5; 248/322, 340, 639, 669, 654; 241/234, 236

[56] References Cited

U.S. PATENT DOCUMENTS 3,390,040 6/1968 Moser et al. ........................ 156/473
4,168,806 9/1979 Jakobs ................................. 241/234
4,420,863 12/1983 Trimmer et al. ................... 29/121.5

Primary Examiner—Edward Kimlin
Assistant Examiner—Ramon R. Hoch
Attorney, Agent, or Firm—Schwartz & Weinrieb

[57] ABSTRACT

Disclosed herein is a method and means for replacing upper and lower corrugated rolls in a single facer having a cassette frame for rotatably supporting the upper and lower rolls and a main frame to which the cassette frame is detachably connected. The method comprises the steps of suspending and moving away the cassette frame apart from a predetermined mounting position in the single facer, keeping a spare cassette rotatably supporting other upper and lower rolls waiting in a suspended condition and fixing the spare cassette frame to the predetermined mounting position in the single facer in place of the cassette frame removed. Means for performing the method is disclosed which comprises a cassette frame rotatably supporting the upper and lower rolls; and a main frame carrying a pressure roll and a gluing unit. The cassette frame is detachably connected to the main frame.

20 Claims, 6 Drawing Figures

METHOD OF AND MEANS FOR REPLACING CORRUGATING ROLLS IN A SINGLE FACER

BACKGROUND OF THE INVENTION

1. Field of the Invention

The present invention relates to a method of and means for replacing corrugating rolls in a single facer.

2. Description of the Prior Art

In a corrugation line for producing corrugated fiberboard, single facers are used to produce single faced corrugated fiberboard. With known constructions of a single facer, a pair of upper and lower corrugating rolls with respective corrugated outer surfaces are disposed in such a way as to engage with each other. A corrugating medium is passed between the rolls in a pressed or engaged manner to be formed into a corrugated configuration or flute, which will be coated at the tips thereof with glue. The single facer also has a pressure roll which is adapted to adhere under pressure the corrugating medium to a linerboard which is fed from a direction opposite to the corrugating medium to produce single faced corrugated fiberboard. Each of the upper and lower rolls employed in the single facer has, as mentioned above, circumferential corrugations extending in the longitudinal direction thereof. The upper roll is freely rotatable and the lower roll is connected to an external source of drive for positive rotation. The upper roll is pressed against the lower roll by means of a spring force or any fluid pressure so that the corrugating medium introduced between the rolls is pressed under appropriate nip pressure to form flutes thereon. The rolls are, in general, made of chrome molybdenum steel which is hardened by quenching or surface-hardened by chromium plating or the like. It is natural, however, that such rolls should have limited durability or service life. After a long period of operation of the single facer, the corrugations formed on the rollers are unevenly worn at the central portions thereof where the medium passes thereover as compared with the longitudinally opposite ends. Such worn rolls cannot provide satisfactory fluting to the corrugating medium. When the service life has ended, it is required to replace the worn rolls whose corrugations are to be reground for reuse. In the prior art single facer, such replacement of a pair of upper and lower rolls has been troublesome because of its construction, and in practice, no less than one or two days are spent on the work. Such time-consuming replacement work results in increased downtime not only of the single facer but also of the whole corrugator line, and consequently the operational efficiency and the production schedule suffer severely. After all, any surface-hardened roll must be periodically replaced because of wear with age, as mentioned above. Therefore, it is a long-pending question and requirement to speed up the roll replacement in the single facer, and this problem has not been completely settled yet.

OBJECT OF THE INVENTION

It is, accordingly, the object of the present invention to reduce as much downtime as possible when the operation of the corrugator line is interrupted and to thereby minimize the unfavorable influence on the operational efficiency by effecting speedy replacement of the upper and lower rolls in the single facer.

SUMMARY OF THE INVENTION

According to the present invention, there is provided a method of replacing upper and lower corrugating rolls in a single facer having a cassette frame rotatably supporting the upper and lower rolls which have corrugated outer surfaces respectively and a main frame to which the cassette frame is detachably connected, comprising the steps of suspending the cassette frame apart from a predetermined mounting position in the single facer to bring it away, keeping a spare cassette frame rotatably supporting other upper and lower rolls waiting in a suspended condition and fixing the spare cassette frame to the predetermined position in the single facer in place of the cassette frame removed.

Furthermore, in order to perform the above method, there is provided for use in a single facer having upper and lower corrugating rolls which have corrugated outer surfaces respectively, a pressure roll and a gluing unit, means for replacing the upper and lower rolls, comprising a cassette frame rotatably supporting the upper and lower rolls and a main frame carrying the pressure roll and gluing unit. The cassette frame is detachably connected to the main frame.

BRIEF DESCRIPTION OF THE DRAWINGS

The present invention will become more fully apparent from the claims and description as it proceeds in connection with the drawings, wherein:

DETAILED DESCRIPTION OF A PREFERRED EMBODIMENT

Figure 1:
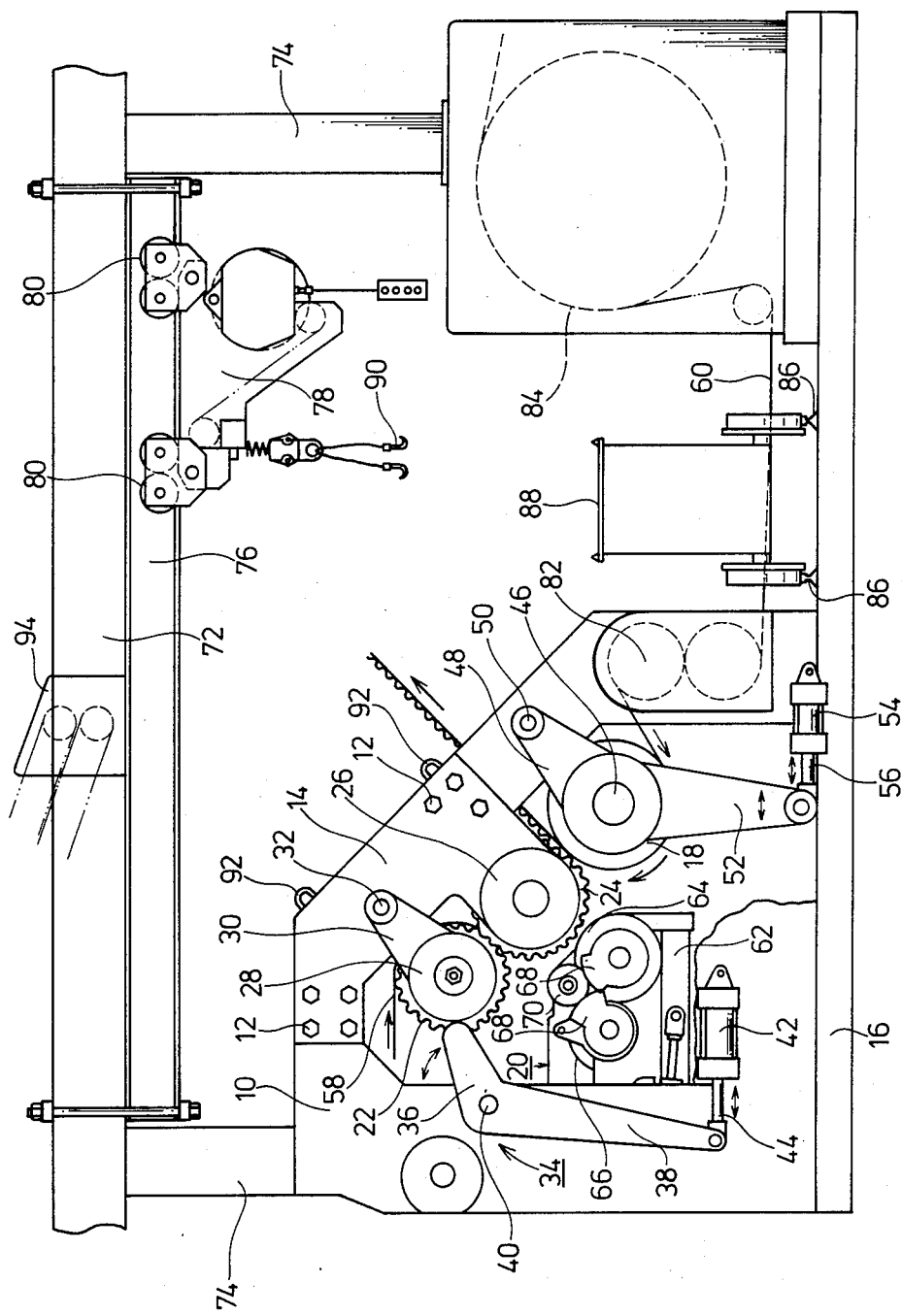
FIGS. 1 and 2 are schematic side elevational views of a single facer including means for replacing upper and lower rolls according to the present invention.
Figure 2:
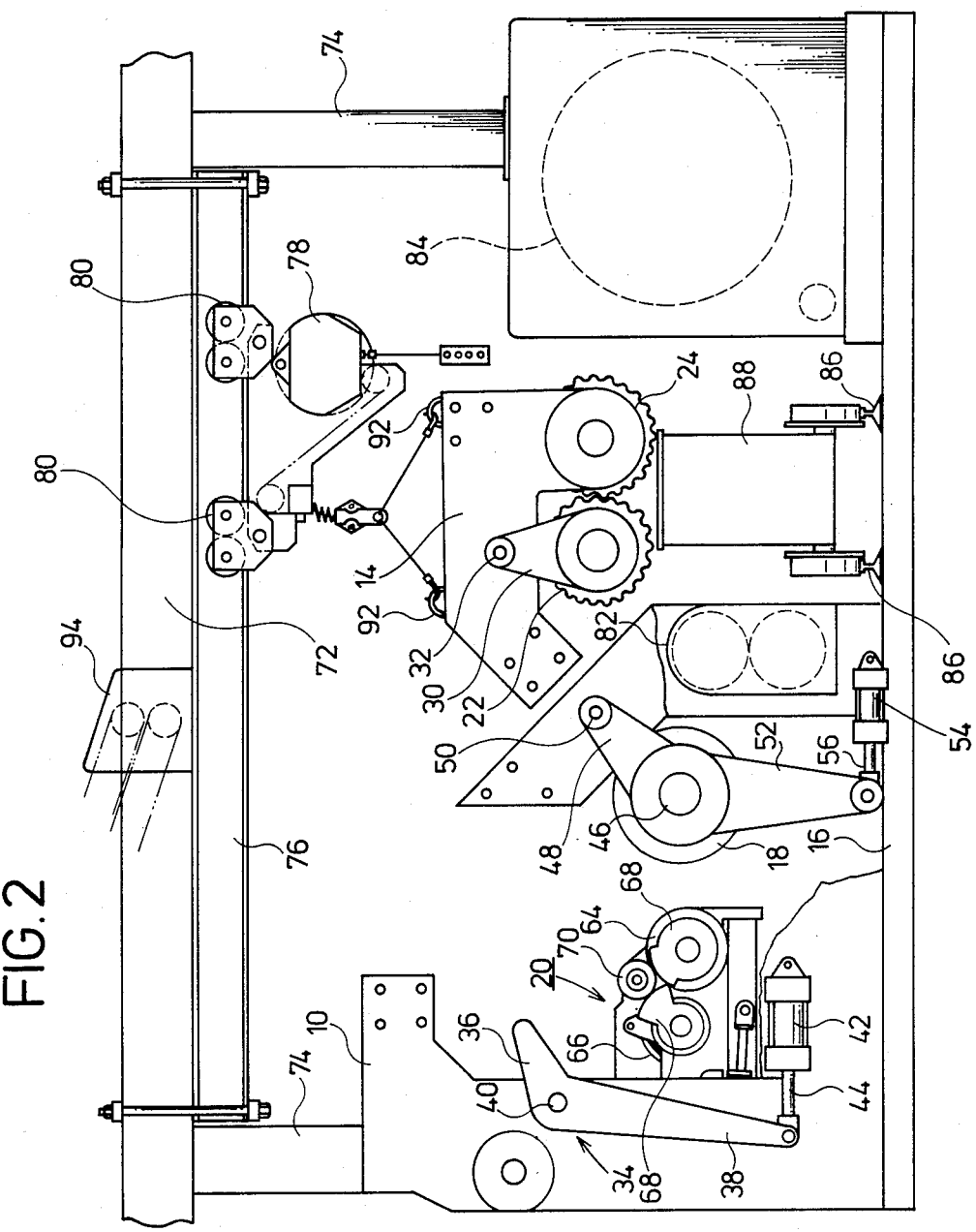

Referring now to FIGS. 1 and 2 in which a preferred embodiment of the present invention is shown, a single facer has a framework for rotatably supporting various rotating members such as corrugating rolls and is basically composed of a main frame 10 and a cassette frame 14 detachably mounted to the main frame 10 through connecting means 12 such as bolts. The main frame 10 has a pair of opposite upright members disposed on a horizontal base 16. The main frame 10 supports a pressure roll 18 and a gluing unit 20 which will be mentioned later.

As shown in FIG. 2, the main frame 10 is open at the upper portion thereof to form extensions spaced a predetermined distance apart. The cassette frame 14 is detachably mounted to the main frame 10 between the extensions through, for example, the bolts 12 (see FIG. 1). The cassette frame 14 has a pair of parallel frame plates spaced apart the same distance as the main frame 10. An upper corrugating roll 22 and a lower corrugating roll 24 having corrugated outer surfaces respectively are rotatably supported by the cassette frame plates thereof. The lower roll 24, for example, is rotatably received by a pair of bearings 26 directly secured to the frame plates of the cassette frame 14, its axis being fixedly positioned. On the other hand, the upper roll 22 is rotatably received by a pair of bearings 28 from each of which a bracket 30 extends and is attached at the free end thereof to the cassette frame 14 through a pin 32, so that the upper roll 22 can circumferentially swing a little around the pin 32.

The cassette frame 14 rotatably supporting the upper roll 22 and the lower roll 24 is mounted on the main frame 10 at a predetermined mounting position between the extensions, as will be mentioned later. To this end, the arrangement is such that a nip pressure adjusting lever 34 and the pressure roll 18 both carried on the main frame 10 operatively come in contact with the upper and lower rolls. The nip pressure adjusting lever 34 is pivotally mounted on the main frame 10 through a pin 40 and has a short arm 36 and a long arm 38 which are displaceable at a predetermined angle around the pin 40. The short arm 36 comes in and out of contact at the free end thereof with an outer flange of the bearing 28 for the upper roll 22. The long arm 38 is loosely connected at the free end thereof to a piston rod 44 of a double-acting hydraulic cylinder 42 carried on the main frame 10. With this construction, when cylinder 42 is actuated or deactuated, the lever 34 is pivoted around the pin 40 to adjust the nip pressure of the upper roll 22.

The pressure roll 18 is received by a pair of bearings 46 from each of which a bracket 48 extends and is attached at the free end thereof to the main frame 10 through a pin 50 so as to permit swinging movement of the pressure roll 18. A lever 52 extending downwardly from the bearing 46 has a free end loosely connected to a piston rod 56 of another double-acting hydraulic cylinder 54 carried on the main frame 10. Under a contacting pressure properly adjusted by this construction the linerboard 60 is pressed against the corrugating medium 58, when they pass between the pressure roll 18 and the lower roll 24. It will be understood that both the nip pressure adjusting unit and the unit for adjusting the contacting pressure between the corrugating medium and the linerboard, being mounted on the main frame 10, are completely isolated from the cassette frame 14 with no mechanical relationship thereto.

Disposed within the main frame 10 is a known gluing unit 20 having a glue pan 62 in which glue is stored, an applicator roll 64 and a doctor roll 66. An appropriate amount of glue in the glue pan 62 is taken up by the applicator roll 64 and the doctor roll 66 to be applied on the flute tips of corrugating medium 58. Each of the rolls has a sector gear 68 secured to the shaft thereof. The respective sector gears are engaged with a common driving gear 70 so as to change the axial distance between the rolls, thereby adjusting the amount of glue to be applied.

The base 16 has supported thereon upright struts 74 which in turn have a beam 72 extending therebetween and above the single facer. A rail 76 is a laid under the beam 72, and a chain block 78 is movably suspended along the rail 76 through wheels 80. Though only one chain block is shown in FIGS. 1 and 2, two chain blocks are employed in the single facer, and preferably such chain blocks 78 move along two respective rails 76 extending in parallel under the beam 72. However, depending upon the space restriction, the two chain blocks 78 may be designed to move on a single rail 76.

As shown in FIGS. 1 and 2, there are provided preheater rolls 82 and a preheater 84 which serve to preheat the linerboad 60 fed from a mill roll stand, not shown, for moisture adjustment. The preheater 84 has the additional function of adjusting the tension of the linerboard 60.

The preheater rolls 82 and the preheater 84 are suitably spaced from each other, and two rails 86 extend on the base 16 between the preheater rolls 82 and the preheater 84 at right angles to the direction of travel of the linerboard 60. A truck 88 moves on the rails 86 for carrying a cassette frame 14 removed from the main frame 10 in such a way as will be mentioned later. The cassette frame 14 has catches 92 adapted for engagement with hooks 90 hung from the chain block 78 so as to be supended by the chain block 78, as shown in FIGS. 1 and 2.

Figure 3A:
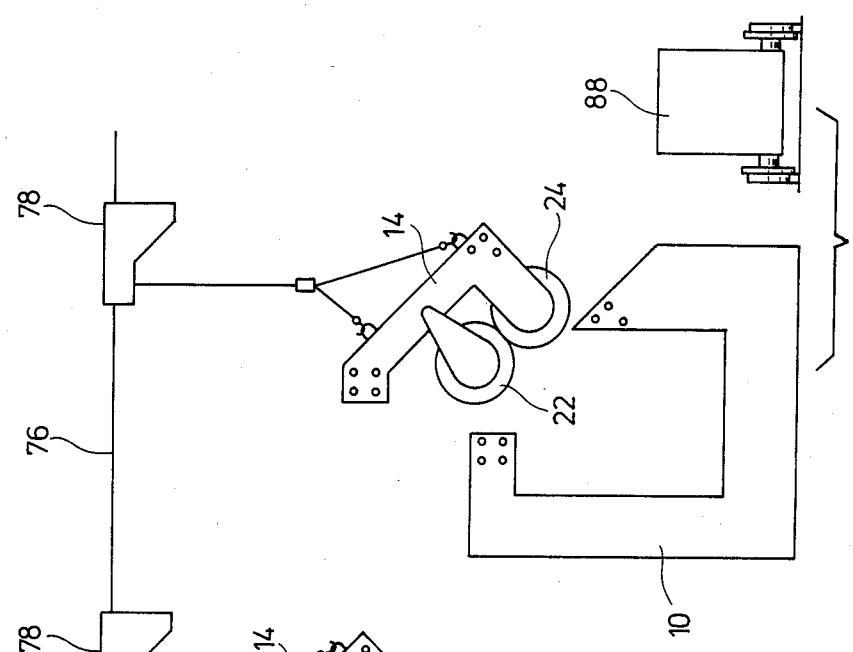
FIGS. 3a, 3b, 3c and 3d are schematic representations, illustrating various phases of operation when the rolls are replaced according to the present invention.

Now the operation of the roll replacing means thus constructed will be mentioned in conjunction with the method of the present invention. With the cassette frame 14 fixedly mounted on the main frame 10 through the bolts 12 as shown in FIG. 1, the corrugating medium 58 passes through the engagement between the corrugations of the upper and lower rolls 22 and 24 to be formed into a flute configuration. Then, an appropriate amount of glue is applied to the flute tips of the medium 58 by the applicator roll 64. On the other hand, the linerboard 60, having the moisture adjusted and the tension controlled by the preheater 84 and the preheater rolls 82, is pressed against the medium 58 on the flute tips by the pressure roll 18 so as to form a single faced corrugated fiberboard, which is fed toward a take-up conveyer 94 located above the single facer. In this way, single faced fiberboard can be produced by the single facer. As mentioned above, however, long operation of the single facer causes the corrugations of the upper and lower rolls 22 and 24 to be worn down to the point of requiring replacement of the rolls. When the rolls are to be replaced, one of the chain blocks 78 is moved above the cassette frame 14, and the hooks 90 are engaged with the catches 92 of the cassette frame 14. Then, the bolts are unfastened so as to be removed. As shown in FIG. 3a, the other chain block 78 is waiting with a replacement roll suspending by a wire a spare cassette frame 14 which incorporates conditioned upper and lower rolls 22 and 24.

Figure 3B:
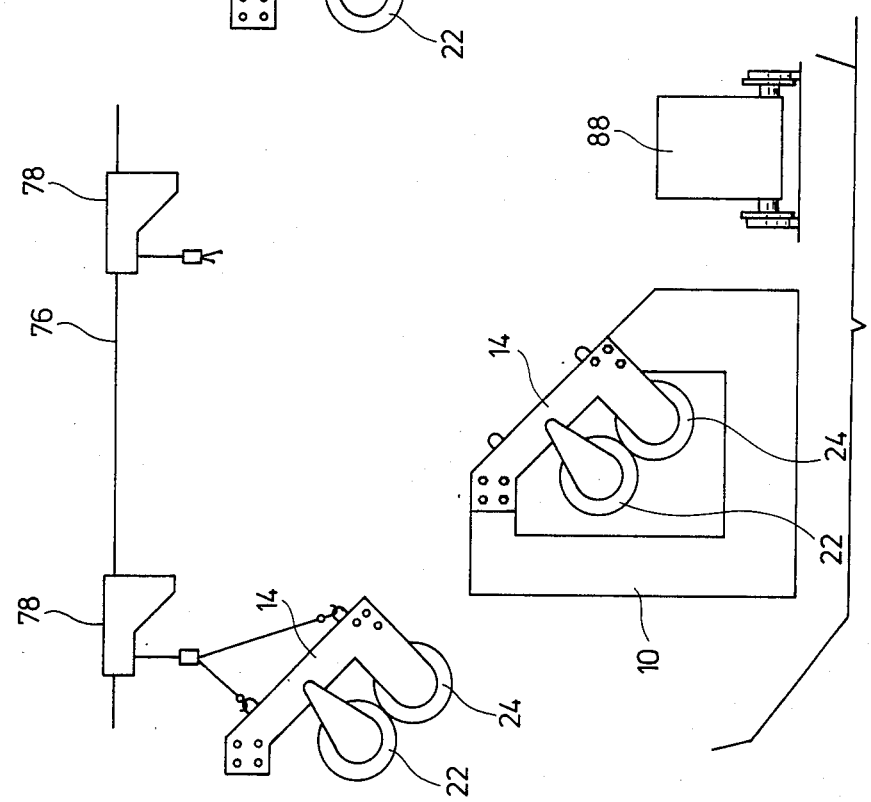
Figure 3D:
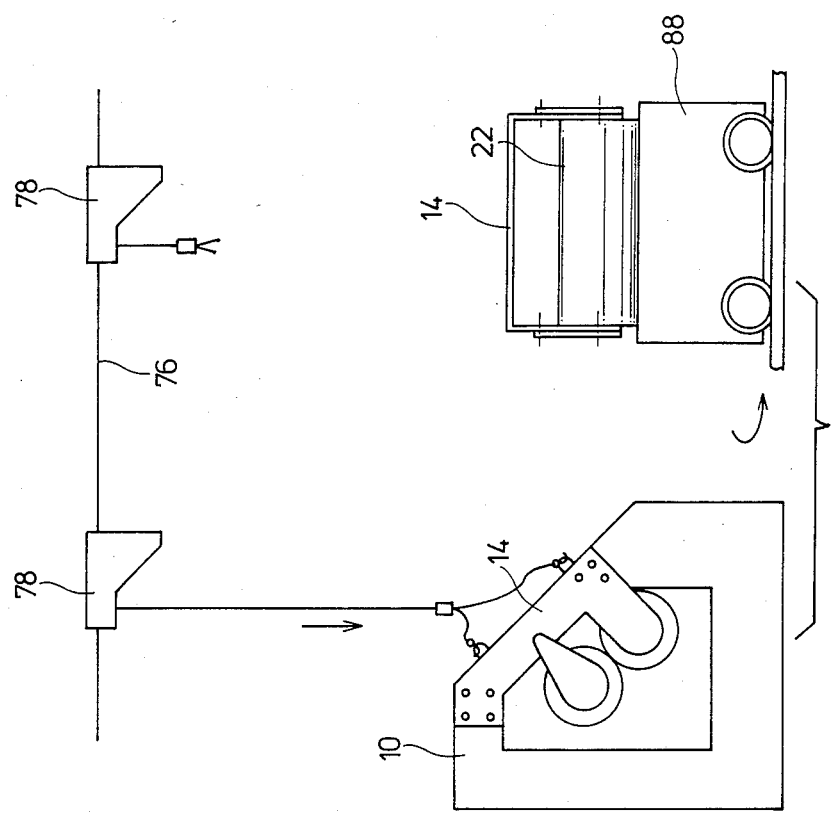
Figure 3C:
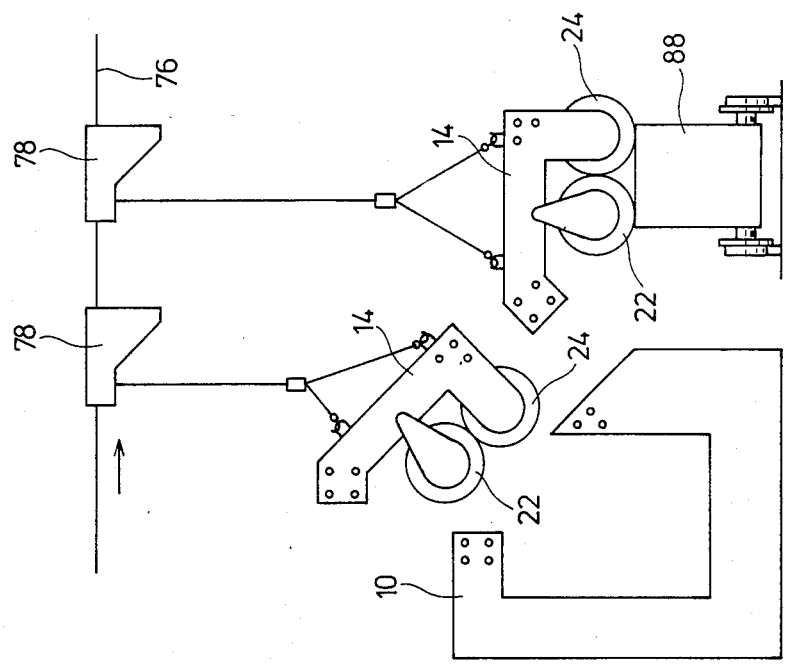

After the bolts 12 are removed, the cassette frame 14 is suspended by the chain block 78 above the main frame 10, as shown in FIG. 3b, and then placed on the truck 88 waiting at the fore part of the single facer, as shown in FIGS. 2 and 3c. As shown in FIGS. 3c and 3d, the spare cassette frame 14 which has been already conditioned is conveyed by the other chain block 78 until it is placed on the main frame 10 at a predetermined mounting position between the extensions thereof, and is then fixed there by the bolts 12. As the truck 88 travels, the cassette frame 14 laid on the truck 88 is transported out of the corrugator line for regrinding as required, as shown in FIG. 3d.

From what has been said, it will be appreciated that the rolls can be replaced extremely quickly, as the upper and lower rolls are supported by the cassette frame which is an independent member detachably connected to the main frame. In fact, it takes about ten minutes only to exchange the cassette frame carrying the rolls, though the prior art roll replacement is one or two days' work. Thus, the idle time when the operation of the corrugator line is interrupted can be considerably reduced and resultantly the production efficiency suffers little.

Furthermore, replacement of the cassette frame will not be disturbed by the unit of adjusting the nip pressure between the upper and lower rolls and the unit of controlling the tension of the linerboard on the press roll which are located apart from the cassette frame, for example on the main frame. The lower roll is positively driven by the power from the motor and the reduction gear. As the power supply can be connected and disconnected easily by a suitable type of coupling employed as a power transmission unit, the lower roll will also not interfere with the operation during cassette frame replacement.

While the invention has been described with reference to a preferred embodiment thereof, it is to be understood that modifications or variations may be easily made without departing from the scope of this invention which is defined by the appended claims.

What is claimed is:

1. A method for replacing corrugating rolls within a corrugating machine, comprising the steps of:
   providing said corrugating machine with a main frame;
   rotatably mounting a first set of corrugating rolls within a first cassette frame;
   detachably mounting said first cassette frame, and said first set of corrugating rolls mounted therewithin, upon said main frame;
   moving a second cassette frame, with a second set of corrugating rolls rotatably mounted therewithin, within the vicinity of said main frame;
   detaching said first cassette frame, with said first set of corrugating rolls mounted therewithin, from said main frame; and
   detachably mounting said second cassette frame, with said second set of corrugating rolls mounted therewithin, upon said main frame.

2. A method as set forth in claim 1, wherein:
   said corrugating machine is a single facer for fabricating single faced corrugated fiberboard.

3. A method as set forth in claim 1, wherein:
   said sets of corrugating rolls rotatably mounted upon said cassette frames comprise pairs of corrugating rolls.

4. A method as set forth in claim 3, providing the additional steps of:
   fixedly mounting a first one of said pair of corrugating rolls upon said cassette frame;
   pivotably mounting said second one of said pair of corrugating rolls upon said cassette frame.

5. A method as set forth in claim 4, providing the additional step of:
   adjusting the pivotable position of said second one of said pair of corrugating rolls upon said cassette frame relative to said first one of said pair of corrugating rolls so as to vary the nip pressure defined between said pair of corrugating rolls.

6. A method as set forth in claim 2, wherein:
   said corrugated fiberboard comprises a corrugating medium and a linerboard.

7. A method as set forth in claim 6, comprising the additional steps of:
   pivotably mounting a pressure roll upon said main frame for cooperation with a first one of said corrugating rolls;
   conducting a corrugating medium into the nip defined between said pressure roll and said first one of said corrugating rolls;
   conducting a linerboard into said nip defined between said pressure roll and said first one of said corrugating rolls; and
   adjusting the pivotably position of said pressure roll upon said main frame for defining a predetermined nip pressure defined between said pressure roll and said first one of said corrugating rolls.

8. A method as set forth in claim 7, further comprising:
   preheating said linerboard at a position upstream of said nip defined between said pressure roll and said first one of said corrugating rolls so as to control the moisture content of said linerboard.

9. A method as set forth in claim 1, wherein:
   said first and second cassette frames are suspendingly supported by overhead cranes when said first and second cassette frames are respectively removed from, and mounted upon, said main frame.

10. Corrugating roll apparatus, comprising:
    a main frame;
    a cassette frame;
    a set of corrugating rolls rotatably mounted upon said cassette frame; and
    means detachably mounting said cassette frame, having said set of corrugating rolls rotatably mounted thereon, upon said main frame,
    whereby when said set of corrugating rolls require replacement with a new second set of corrugating rolls, said cassette frame, along with said set of corrugating rolls mounted thereon, may be removed from said main frame and a new cassette frame, with said new second set of corrugating rolls mounted thereon, may be mounted upon said main frame.

11. Apparatus as set forth in claim 10, wherein:
    said corrugating apparatus is a single facer for fabricating single faced corrugated fiberboard.

12. Apparatus as set forth in claim 11, wherein:
    said corrugated fiberboard comprises a corrugating medium and a linerboard.

13. Apparatus as set forth in claim 10, wherein:
    said sets of corrugating rolls rotatably mounted upon said cassette frames comprise pairs of corrugating rolls.

14. Apparatus as set forth in claim 13, further comprising:
    means fixedly mounting a first one of said pair of corrugating rolls upon said cassette frame;
    means pivotably mounting a second one of said pair of corrugating rolls upon said cassette frame; and
    means mounted upon said main frame for engagement with said second one of said pair of corrugating rolls for adjusting the pivotable position of said second one of said pair of corrugating rolls upon said cassette frame relative to said first one of said pair of corrugating rolls upon said cassette frame so as to vary the nip pressure defined between said pair of corrugating rolls.

15. Apparatus as set forth in claim 12, further comprising:
    means pivotably mounting a pressure roll upon said main frame for defining a nip with one of said corrugating rolls into which said corrugating medium and said linerboard are conducted; and
    means for adjusting the pivotable position of said pressure roll so as to vary the nip pressure defined between said pressure roll and said one of said corrugating rolls.

16. Apparatus as set forth in claim 15, further comprising:
    means mounted upon said main frame for applying glue to said corrugating medium at a position upstream of said nip defined between said one of said corrugating rolls and said pressure roll for facilitating bonding of said corrugating medium and said linerboard.

17. Apparatus as set forth in claim 15, further comprising:

means defined upon said main frame at a position upstream of said nip defined between said one of said corrugating rolls and said pressure roll for preheating said linerboard so as to control the moisture content of said linerboard.

18. Apparatus as set forth in claim 14, wherein:

said means for adjusting said pivotable position of said second one of said pair of corrugating rolls upon said cassette frame comprises a double-acting hydraulic piston-cylinder.

19. Apparatus as set forth in claim 15, wherein:

said means for adjusting said pivotable position of said pressure roll comprises a double-acting hydraulic piston-cylinder.

20. Apparatus as set forth in claim 10, further comprising:

overhead crane means for suspendingly supporting said cassette frame and said new cassette frame when said cassette frame and said new cassette frame are respectively removed from and mounted upon said main frame.

* * * * *